(12) United States Patent
Wei

(10) Patent No.: US 12,474,789 B2
(45) Date of Patent: Nov. 18, 2025

(54) INPUT DEVICE AND ELECTRONIC DEVICE

(71) Applicant: Vast Intelligence Limited., New Taipei (TW)

(72) Inventor: Tien-Ho Wei, New Taipei (TW)

(73) Assignee: Vast Intelligence Limited., New Taipei (TW)

( * ) Notice: Subject to any disclaimer, the term of this patent is extended or adjusted under 35 U.S.C. 154(b) by 0 days.

(21) Appl. No.: 18/784,869

(22) Filed: Jul. 25, 2024

(65) Prior Publication Data

US 2025/0348157 A1    Nov. 13, 2025

(30) Foreign Application Priority Data

May 10, 2024   (TW) .................................. 113117288

(51) Int. Cl.
*G06F 3/0354* (2013.01)
*G06F 3/02* (2006.01)

(52) U.S. Cl.
CPC .......... *G06F 3/0354* (2013.01); *G06F 3/0213* (2013.01)

(58) Field of Classification Search
CPC .............................. G06F 3/0354; G06F 3/0213
See application file for complete search history.

(56) References Cited

U.S. PATENT DOCUMENTS

2009/0058802 A1\* 3/2009 Orsley ................. G06F 3/0362
345/157
2024/0061525 A1   2/2024 Iimure et al.

FOREIGN PATENT DOCUMENTS

| CN | 103140821 A | 6/2013 |
| CN | 111367404 A | 7/2020 |
| CN | 219105468 U | 5/2023 |
| TW | I827412 B | 12/2023 |

\* cited by examiner

Primary Examiner — Jonathan A Boyd
(74) Attorney, Agent, or Firm — Li & Cai Intellectual Property Office

(57) ABSTRACT

An input device and an electronic device are provided. The input device includes a support structure, a cover, a magnetic member, and a magnetic sensor. One end of the support structure is fixed to a substrate, and the cover is fixed to another end of the support structure. The magnetic member is disposed on the cover. The magnetic sensor is positioned within an orthogonal projection area of the magnetic member on the substrate. The cover is operable to move relative to the substrate via the support structure, and the magnetic member is movable with the cover, such that the magnetic sensor senses and converts a magnetic force change into a control signal. The electronic device receives the control signal for controlling movement, a single click, or a double click of a mouse, or for direction control of an application program.

18 Claims, 11 Drawing Sheets

INPUT DEVICE AND ELECTRONIC DEVICE

CROSS-REFERENCE TO RELATED PATENT APPLICATION

This application claims the benefit of priority to Taiwan Patent Application No. 113117288, filed on May 10, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an input device and an electronic device, and more particularly to an input device that is used for controlling a mouse cursor or a direction and an electronic device that includes the input device.

BACKGROUND OF THE DISCLOSURE

When an existing laptop computer is not provided with a touch panel, a user can only control a cursor by using an external mouse. Therefore, if the user forgets to bring the mouse, the user may be troubled by the problem of not being able to manipulate the cursor.

SUMMARY OF THE DISCLOSURE

In response to the above-referenced technical inadequacy, the present disclosure provides an input device and an electronic device, so as to improve an issue of user inconvenience in which cursors of certain laptop computers can only be controlled through external connection to a mouse.

In order to solve the above-mentioned problem, one of the technical aspects adopted by the present disclosure is to provide an input device, which includes: a support structure, a cover, at least one magnetic member, at least one magnetic sensor, and a processor. One end of the support structure is fixed to a substrate, and one side of the cover is fixed to another end of the support structure. The at least one magnetic member is disposed on the cover. The at least one magnetic sensor is disposed on the substrate. The at least one magnetic member is spaced apart from the at least one magnetic sensor, and the at least one magnetic sensor is positioned within an orthogonal projection area of the at least one magnetic member on the substrate. The processor is electrically connected to the at least one magnetic sensor. The cover is operable to move relative to the substrate via the support structure, and the at least one magnetic member is movable with the cover, such that the at least one magnetic sensor senses a magnetic force change and correspondingly generates a sensing signal. The processor converts the sensing signal into a control signal, and transmits the control signal to an electronic device. The electronic device controls movement of a cursor according to the control signal, or the electronic device uses the control signal for direction control of an application program, or as a mouse single-click signal or a mouse double-click signal.

In order to solve the above-mentioned problem, another one of the technical aspects adopted by the present disclosure is to provide an electronic device, which includes: an electronic body and the input device of the present disclosure. The input device is disposed on the electronic body, and the electronic body is a laptop computer, a keyboard, a presentation remote, a mobile phone, a tablet computer, a joystick, or a mouse.

Therefore, the input device of the present disclosure can be installed on the keyboard, and a user can control the cursor by operating the input device. In this way, without external connection to the mouse, the user is still capable of controlling the cursor. The electronic device of the present disclosure includes the input device, thereby allowing the user to operate the input device and control movement of the cursor without external connection to the mouse. Alternatively, the electronic device can use the control signal for direction control of the application program, or as the mouse single-click signal or the mouse double-click signal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
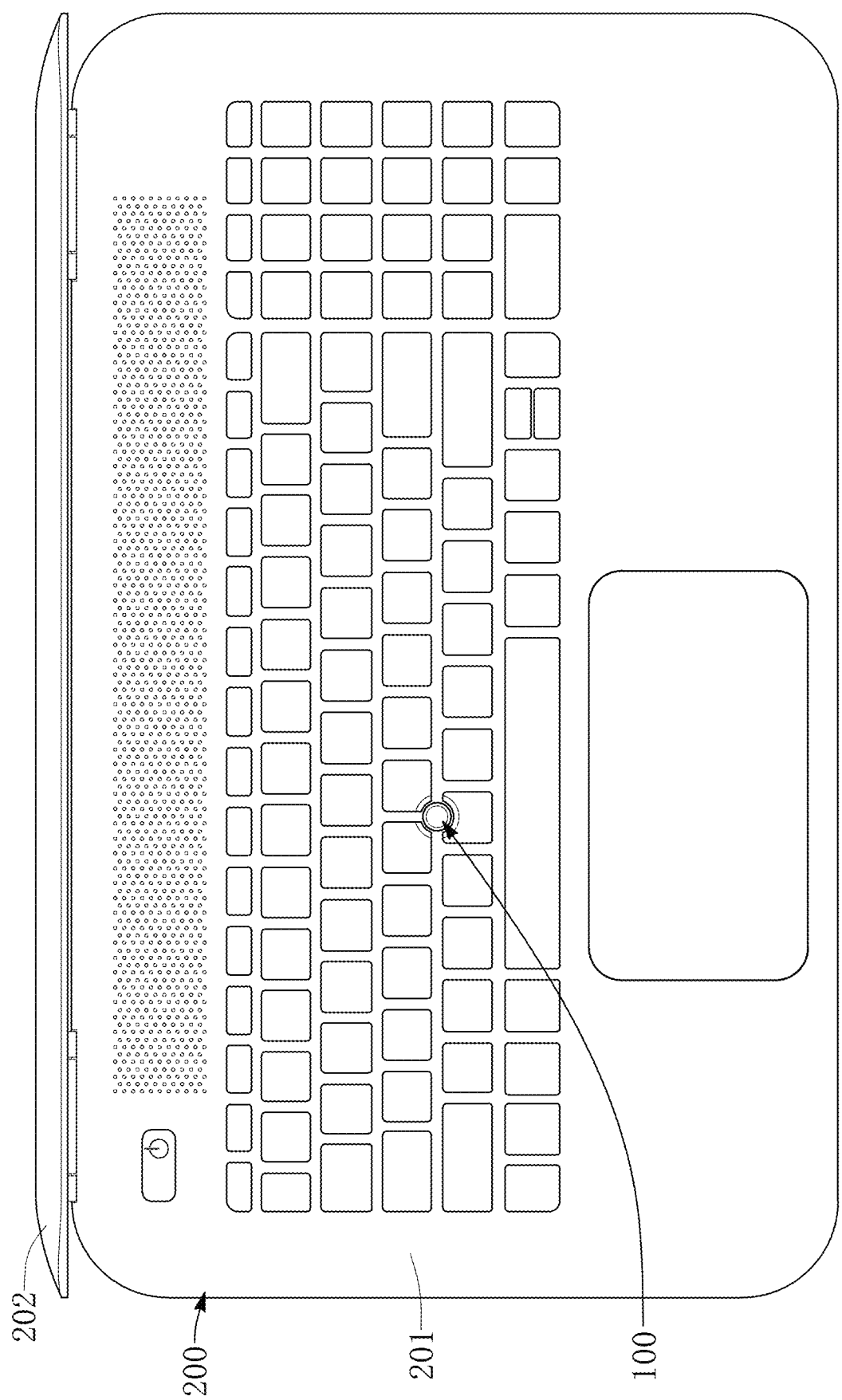
FIG. 1 is a schematic view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
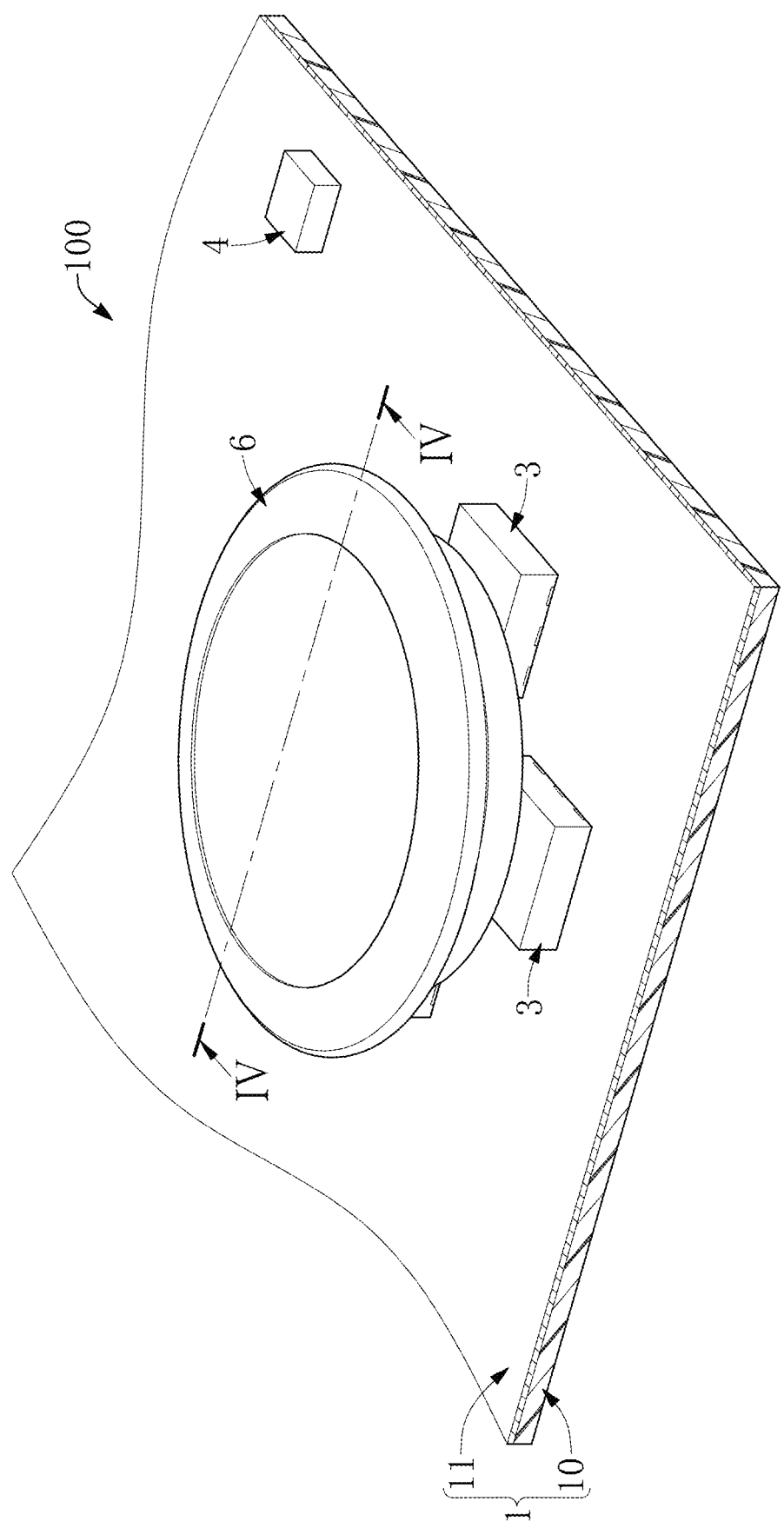
FIG. 2 is a schematic view of an input device according to a first embodiment of the present disclosure.
Figure 3:
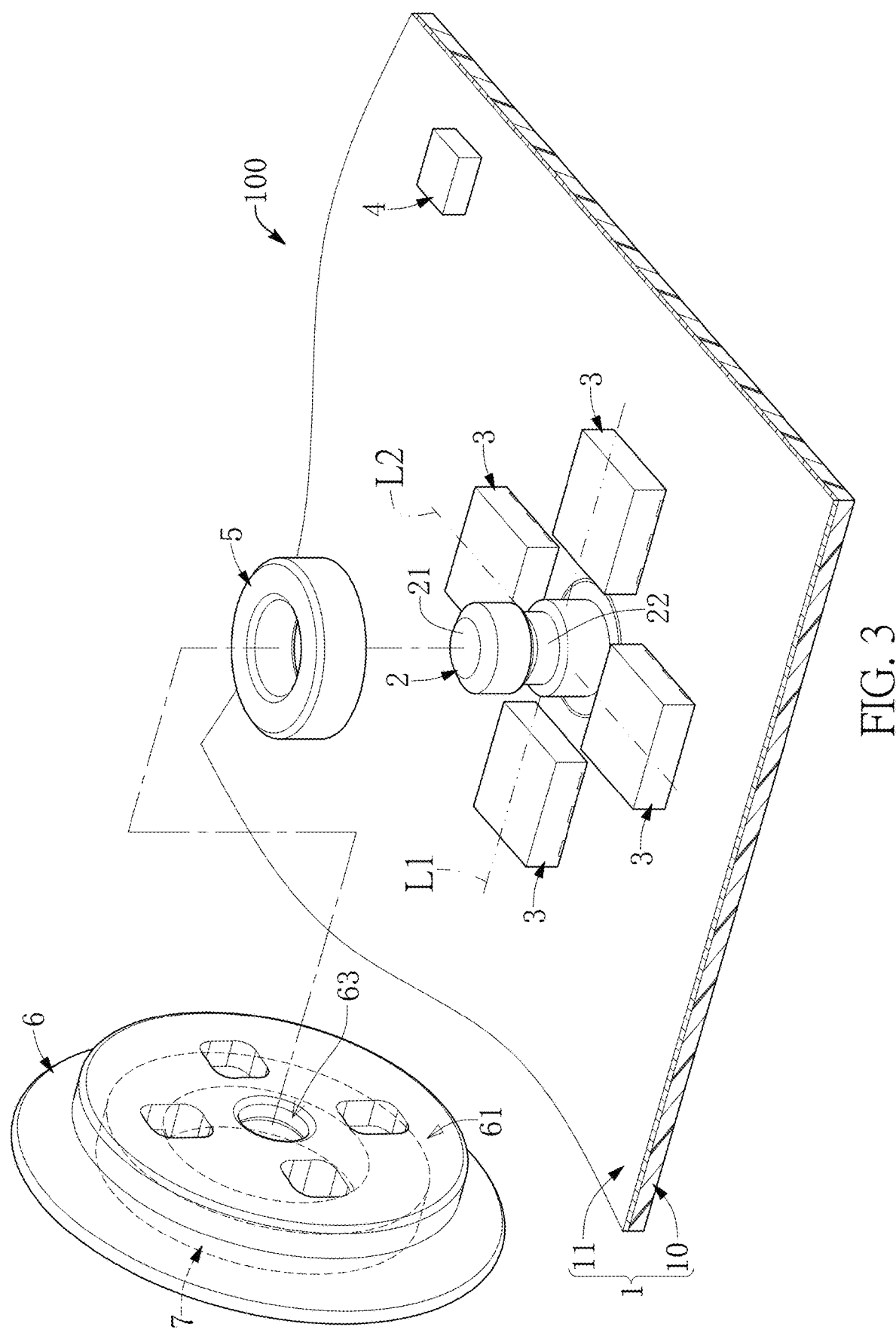
FIG. 3 is a schematic partially exploded view of the input device according to the first embodiment of the present disclosure.
Figure 4:
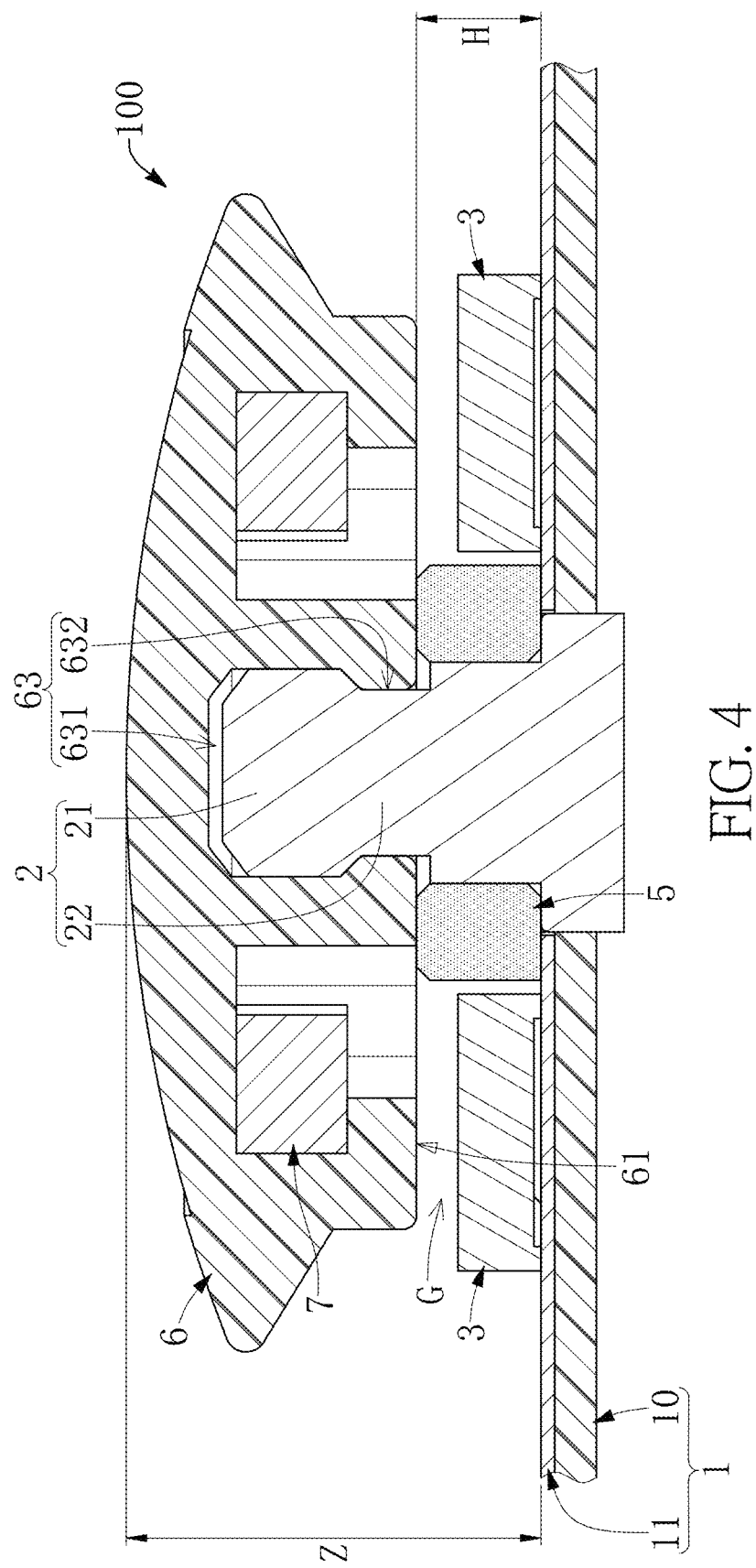
FIG. 4 is a schematic cross-sectional view of the input device taken along line IV-IV of FIG. 2 according to the first embodiment of the present disclosure.
Figure 5:
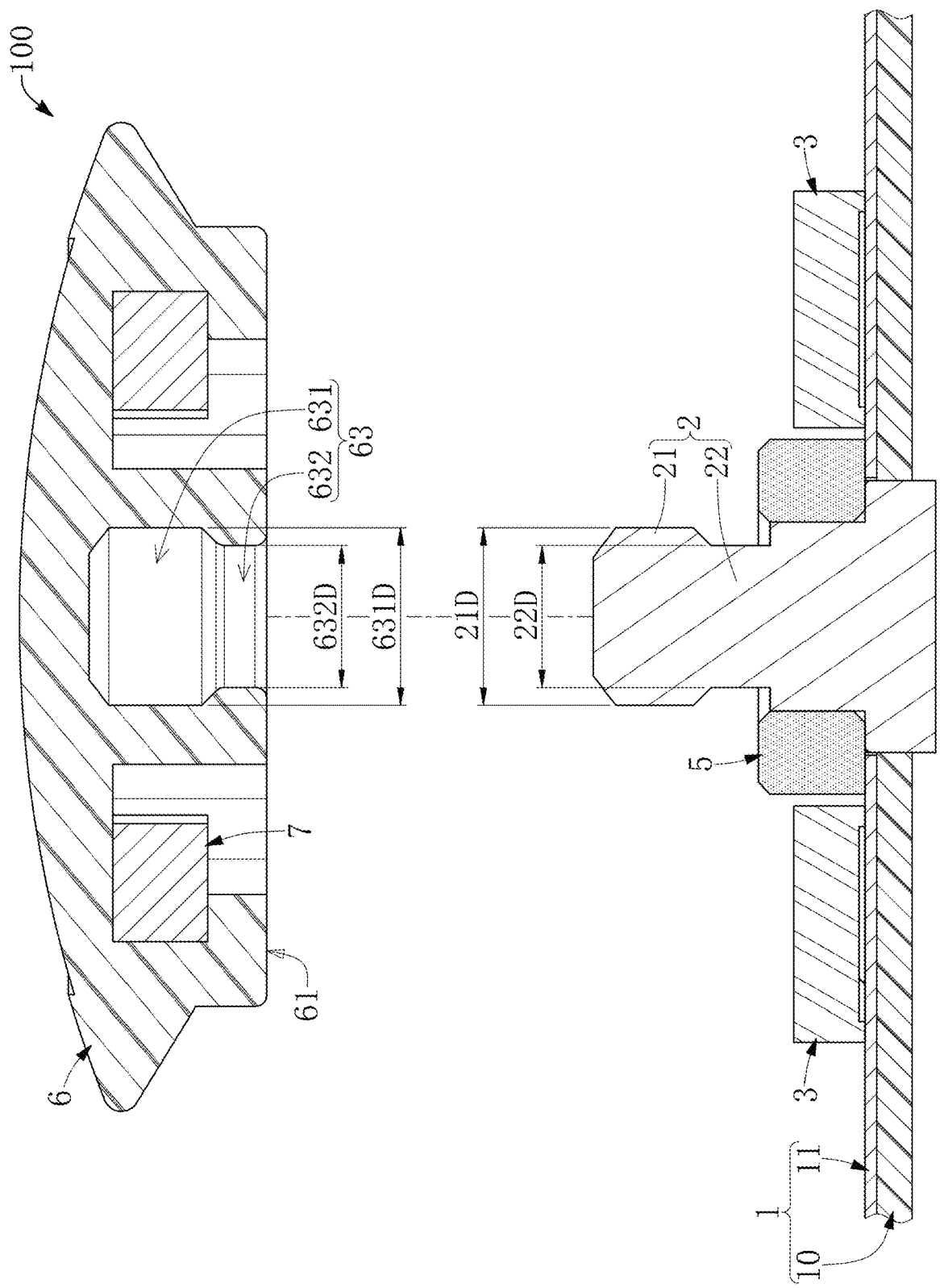
FIG. 5 is a schematic partially exploded view of FIG. 4.

Referring to FIG. 1 to FIG. 5, FIG. 1 is a schematic view of an electronic device according to the present disclosure, FIG. 2 is a schematic view of an input device according to a first embodiment of the present disclosure, FIG. 3 is a schematic partially exploded view of the input device according to the first embodiment of the present disclosure, FIG. 4 is a schematic cross-sectional view of the input device taken along line IV-IV of FIG. 2 according to the first embodiment of the present disclosure, and FIG. 5 is a schematic partially exploded view of FIG. 4.

An electronic device 200 of the present disclosure includes an electronic body and an input device 100 of the present disclosure. The electronic body can be, for example, a laptop computer, a keyboard, a presentation remote, a mobile phone, a tablet computer, a joystick, or a mouse. In one embodiment of the present disclosure, the input device 100 is a controller of a mouse cursor, and a user can control the mouse cursor by operating the input device 100. That is, the user operates the input device 100 instead of a conventional mouse. In a different embodiment, the electronic device 200 can be without a display device 202, and the electronic device 200 is merely a wireless or wired keyboard. It should be noted that, according to practical requirements, the input device 100 of the present disclosure can be installed on various electronic devices (not limited to those mentioned above). For example, the input device 100 can also be installed on an electronic device (such as a mouse, a presentation remote, a tablet computer, or a joystick) that needs to control a direction or a cursor.

The input device 100 of the present disclosure includes a substrate 1, a support structure 2, four magnetic sensors 3, a processor 4, an elastic restoring structure 5, a cover 6, and a magnetic member 7. The quantity of the magnetic sensor 3 or the magnetic member 7 included in the input device 100 may vary according to practical requirements, and is not limited to that shown in the drawings.

The substrate 1 is used as a fixed base plate, and one end of the support structure 2 is fixed to the fixed base plate. In the present embodiment, the support structure 2 is exemplified to be a semi-cylindrical structure, but the shape of the support structure 2 is not limited thereto. For example, the substrate 1 is an insulating board, and includes a fixed base plate 10 and a flexible printed circuit 11. The fixed base plate 10 is, for example, an insulating plate. The flexible printed circuit 11 is fixedly disposed on the fixed base plate 10, and the four magnetic sensors 3 and the processor 4 are fixedly disposed on the flexible printed circuit 11. In a different embodiment, the substrate 1 can also be a rigid printed circuit board, a metal board, or a plastic board. The processor 4 is electrically connected to the four magnetic sensors 3. Each magnetic sensor 3 is used to sense a magnetic force change and thereby generate a sensing signal, and the processor 4 can receive the sensing signal transmitted by each magnetic sensor 3. In a practical application, two of the magnetic sensors 3 can be, for example, disposed on a first axis L1, and another two of the magnetic sensors 3 can be disposed on a second axis L2. The first axis L1 is not parallel to the second axis L2, and the first axis L1 can be perpendicular to the second axis L2.

In one embodiment where the quantity of the magnetic sensor 3 included in the input device 100 is merely two, one of the magnetic sensors 3 can be disposed on the first axis L1, and another one of the magnetic sensors 3 can be disposed on the second axis L2. In an alternative embodiment where the quantity of the magnetic sensor 3 included in the input device 100 is merely two, the two magnetic sensors 3 can also be disposed on the same axis.

The elastic restoring structure 5 is disposed on the substrate 1, and is sleeved on the one end of the support structure 2 that is fixed to the substrate 1. The elastic restoring structure 5 is an elastic structure, and can be elastically deformed when being pressed. For example, the elastic restoring structure 5 is made of elastic materials (such as rubber, silica gel, foam, and plastics), but is not limited thereto. In practice, the shape of the elastic restoring structure 5 can be, for example, annular, but is not limited thereto.

One side of the cover 6 is fixed to another end of the support structure 2. A bottom surface 61 of the cover 6 faces the substrate 1, and abuts against the elastic restoring structure 5. When another side of the cover 6 (which does not face the substrate 1) is operated by the user to move toward the substrate 1, the bottom surface 61 of the cover 6 will apply a force to the elastic restoring structure 5, thereby causing greater elastic deformation of the elastic restoring structure 5. When the cover 6 is no longer operated by the user, an elastic restoring force generated by the pressed elastic restoring structure 5 allows the cover 6 to return to a position before being operated by the user.

The magnetic member 7 can be, for example, an annular structure. The magnetic member 7 can be embedded in the cover 6, and each magnetic sensor 3 is positioned within an orthogonal projection area of the magnetic member 7 on the substrate 1. That is, the position directly above each magnetic sensor 3 corresponds to at least a portion of the magnetic member 7. The magnetic member 7 and the cover 6 can be formed by insert molding.

In a different embodiment of the present disclosure, the quantity of the magnetic member 7 included in the input device 100 can also be four. The four magnetic members 7 are each embedded in the cover 6. It should be noted that, as long as the position directly above each of the four magnetic sensors 3 can correspond to a portion of one of the magnetic members 7, the quantity of the magnetic member 7 may vary according to practical requirements. For example, in another embodiment, the quantity of the magnetic member 7 included in the input device 100 is two. The two magnetic members 7 are embedded in the cover 6, and the position directly above each magnetic sensor 3 faces a portion of one of the magnetic members 7.

In the descriptions above, the magnetic member 7 is exemplified to be embedded in the cover 6. However, how the magnetic member 7 is fixed to the cover 6 is not limited thereto. In a different embodiment, the bottom surface 61 of the cover 6 can be inwardly recessed to form an annular groove. A width of the annular groove can be, for example, slightly less than a width of the magnetic member 7, and the magnetic member 7 is fixedly engaged in the annular groove. In a different embodiment, the magnetic member 7 can also be fixed to the cover 6 by an adhesive. The shape and the size of the magnetic member 7 may vary according to practical requirements, and the position of each of the multiple magnetic members 7 disposed on the cover 6 may also vary according to practical requirements.

When the cover 6 is not operated by the user, a gap G exists between the magnetic member 7 and each magnetic sensor 3, so as to allow movement of the cover 6. Specifically, when the cover 6 is fixed to one side of the substrate 1 via the support structure 2, the bottom surface 61 of the cover 6 abuts against the elastic restoring structure 5. Accordingly, the gap G is formed between the bottom surface 61 of the cover 6 and the magnetic sensor 3.

It is worth mentioning that, in a practical application, a height of the elastic restoring structure 5 that is not pressed is a first height. A height between the bottom surface 61 of the cover 6 and the substrate 1 is a second height H. The first height is greater than the second height H, and the elastic restoring structure 5 is elastically deformed when being pressed against by the cover 6. Specifically, the support structure 2 has a head portion 21 and a neck portion 22, and an outer diameter 21D of the head portion 21 is greater than an outer diameter 22D of the neck portion 22. The cover 6 has an engaging slot 63, the engaging slot 63 has a first accommodating section 631 and a second accommodating section 632, and an inner diameter 631D of the first accommodating section 631 is greater than an inner diameter 632D of the second accommodating section 632. The first accommodating section 631 is engageable with the head portion 21, and the second accommodating section 632 is engageable with the neck portion 22. Through the configuration of the first accommodating section 631, the second accommodating section 632, the head portion 21, and the neck portion 22, a movement range of the cover 6 relative to the support structure 2 is limited. In addition, the one side of the cover 6 that faces the substrate 1 (i.e., the bottom surface 61) presses against the elastic restoring structure 5, such that the elastic restoring structure 5 is slightly and elastically deformed. Simply put, in situations where installation of the input device 100 is complete, and the cover 6 is not operated by the user, the elastic restoring structure 5 can be slightly and elastically deformed.

When the cover 6 is being operated by the user, the magnetic member 7 will actuate with the cover 6, and a certain portion of the magnetic member 7 moves toward an adjacent one of the magnetic sensors 3. In this way, the magnetic sensor 3 senses the magnetic force change, and thereby generates the sensing signal. When the processor 4 receives the sensing signal, the processor 4 correspondingly generates a mouse control signal, and transmits the mouse control signal to a computer. The computer can control the cursor according to the mouse control signal. In an example where the input device 100 does not include the processor 4, each magnetic sensor 3 can directly transmit the sensing signal to the computer, and an application program that runs in the computer can convert the sensing signal into the mouse control signal for moving the mouse cursor.

In the present embodiment, the four magnetic sensors 3 included in the input device 100 can be used to sense actuation of the cover 6 in a +X axis direction, a −X axis direction, a +Y axis direction, and a −Y axis direction, respectively. Accordingly, the cursor can be controlled to move in a corresponding direction. That is, the input device 100 can control the cursor to move on an X-Y plane. In an example where the input device 100 includes the two magnetic sensors 3 that are disposed on the same axis, the two magnetic sensors 3 can be used to sense the magnetic force change of the cover 6 in the +X axis direction and the −X axis direction, or can be used to sense the magnetic force change of the cover 6 in the +Y axis direction and the −Y axis direction. It is worth mentioning that, since the magnetic sensor 3 is used to sense the magnetic force change, the magnetic sensor 3 is capable of correspondingly generating the sensing signal whether the magnetic member 7 approaches or moves away from the magnetic sensor 3. The processor 4 or the computer can determine an operation direction of the cover 6 according to the sensing signal, so as to control a movement direction of the mouse cursor.

In a practical application, when the processor 4 determines that the cover 6 is continuously pressed in the same direction for more than a predetermined time according to the sensing signal, or when the processor 4 determines that a movement distance of the cover 6 exceeds a predetermined distance according to the sensing signal, the processor 4 can, for example, correspondingly generate a rapid movement control signal. According to the rapid movement control signal, the computer controls the cursor to quickly move in one direction. The quickness of movement mentioned herein is in comparison with a movement speed of the mouse under normal situations. For example, if the processor 4 determines that the cover 6 is continuously pressed in the same direction for more than 0.5 seconds (i.e., the predetermined time), the processor 4 will generate the rapid movement control signal, and the cursor will quickly move. On the other hand, if the cover 6 is operated for merely 0.1 seconds, the cursor will move in a relatively slow manner.

For example, if the processor 4 determines that the movement distance of the cover 6 relative to the magnetic sensor 3 exceeds 0.5 mm according to the sensing signal, the processor 4 correspondingly generates the rapid movement control signal, and the cursor will quickly move. On the other hand, if the movement distance of the cover 6 relative to the magnetic sensor 3 is less than 0.5 mm, the cursor will move at a normal speed.

In the electronic device 200 and the input device 100 provided by the present disclosure, through the configuration of the cover 6, the elastic restoring structure 5, the magnetic member 7, and the magnetic sensors 3, the user can control the mouse cursor by operating the input device 100, and the overall size of the input device 100 can be effectively reduced. As such, the input device 100 can be installed on various keyboards, and is particularly suitable for being installed on a keyboard of a laptop computer. It should be noted that, in the descriptions above, the control signal transmitted by the input device 100 is mainly used by the electronic device 200 for controlling the mouse cursor. However, the present disclosure is not limited thereto. In a different embodiment, the electronic device 200 can also use the control signal for controlling the direction function of the application program. For example, the application program is a game. By controlling the input device 100, the user can control characters of the game to move left, right, or in any direction via an electronic device (e.g., a computer, a tablet computer, and a mobile phone).

It should be noted that, in the input device 100 of the present disclosure, through the configuration in which the magnetic sensor 3 is positioned within the orthogonal projection area of the magnetic member 7 on the substrate 1, the sensitivity of the magnetic force change generated due to a distance difference between the magnetic sensor 3 and the magnetic member 7 can be effectively enhanced. That is to say, if the magnetic sensor 3 is not positioned within the orthogonal projection area of the magnetic member 7 on the substrate 1, the sensitivity of the magnetic force change generated due to the distance difference between the magnetic sensor 3 and the magnetic member 7 will be reduced.

As shown in FIG. 4, since the input device 100 of the present disclosure uses the elastic restoring structure 5 for restoring the cover 6 to a state before being pressed, the input device 100 of the present disclosure is not provided with any compression spring. As such, in the input device 100, a vertical height Z between a top end of the cover 6 and the substrate 1 can be less than 4 mm, and is approximately 3 mm.

In practice, according to practical requirements, the processor 4 can correspondingly convert different sensing signals into different control signals. In this way, the computer is capable of controlling the cursor upon receipt of the control signal transmitted by the processor 4, so as to achieve the effect of a single click or a double click of the conventional mouse. For example, when the user presses the cover 6, each magnetic sensor 3 almost senses the magnetic force change at the same time, and the time during which each magnetic sensor 3 senses the magnetic force change is less than the predetermined time. After receiving the sensing signal transmitted by each magnetic sensor 3, the processor 4 can determine that the cover 6 is briefly pressed by the user at a present time, and can correspondingly generate a mouse single-click control signal (which is equivalent to, for example, the control signal that is correspondingly generated after the single click of the conventional mouse). After receiving the mouse single-click control signal, the computer can control the mouse cursor to perform a single-click action. Similarly, the processor 4 can also correspondingly generate a mouse double-click control signal according to the sensing signal transmitted by each magnetic sensor 3. After receiving the mouse double-click control signal, the computer can control the mouse cursor to perform a double-click action.

Figure 6:
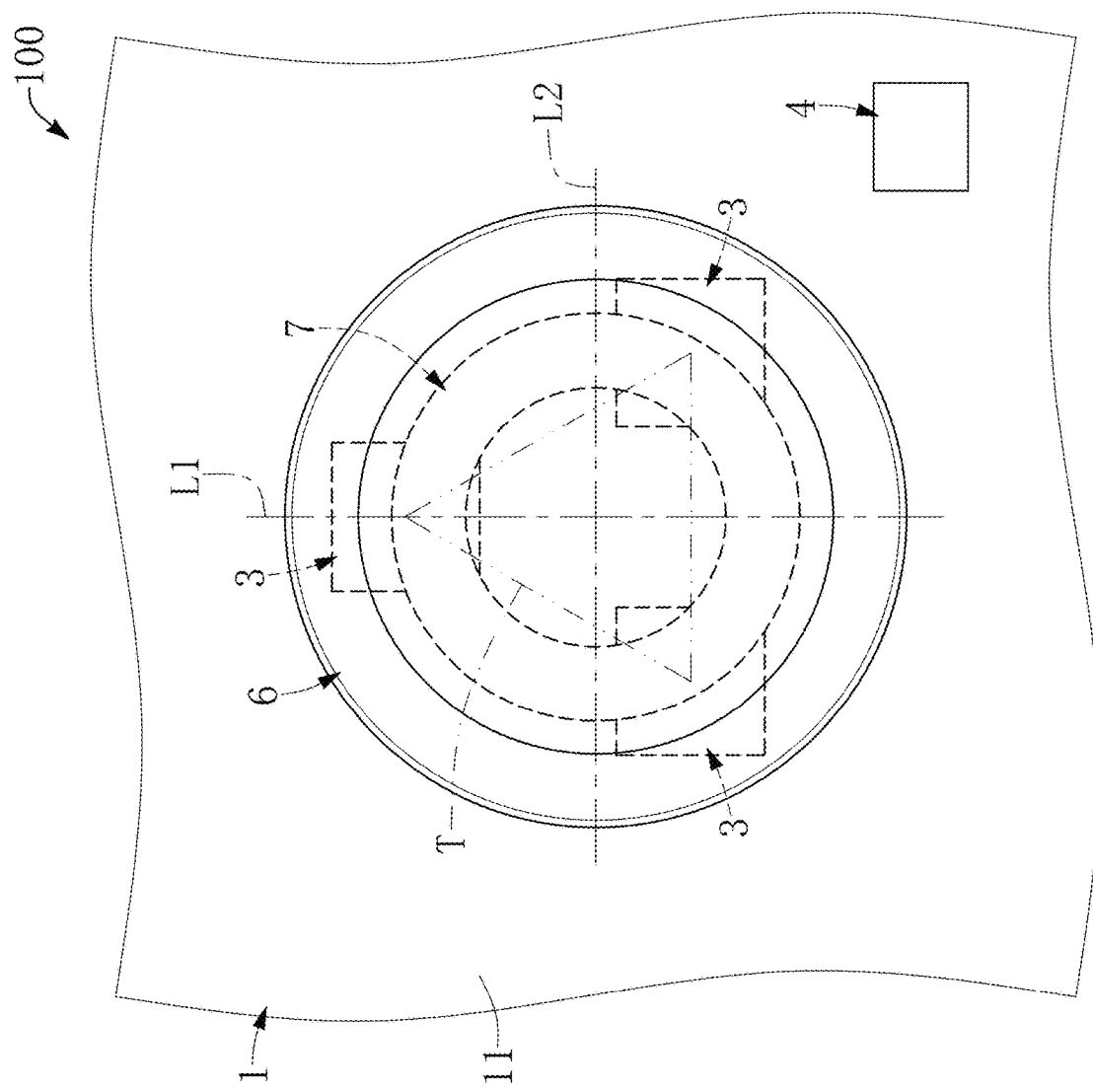
FIG. 6 and FIG. 7 are respectively schematic top views of the input device according to a third embodiment and a fourth embodiment of the present disclosure.
Figure 7:
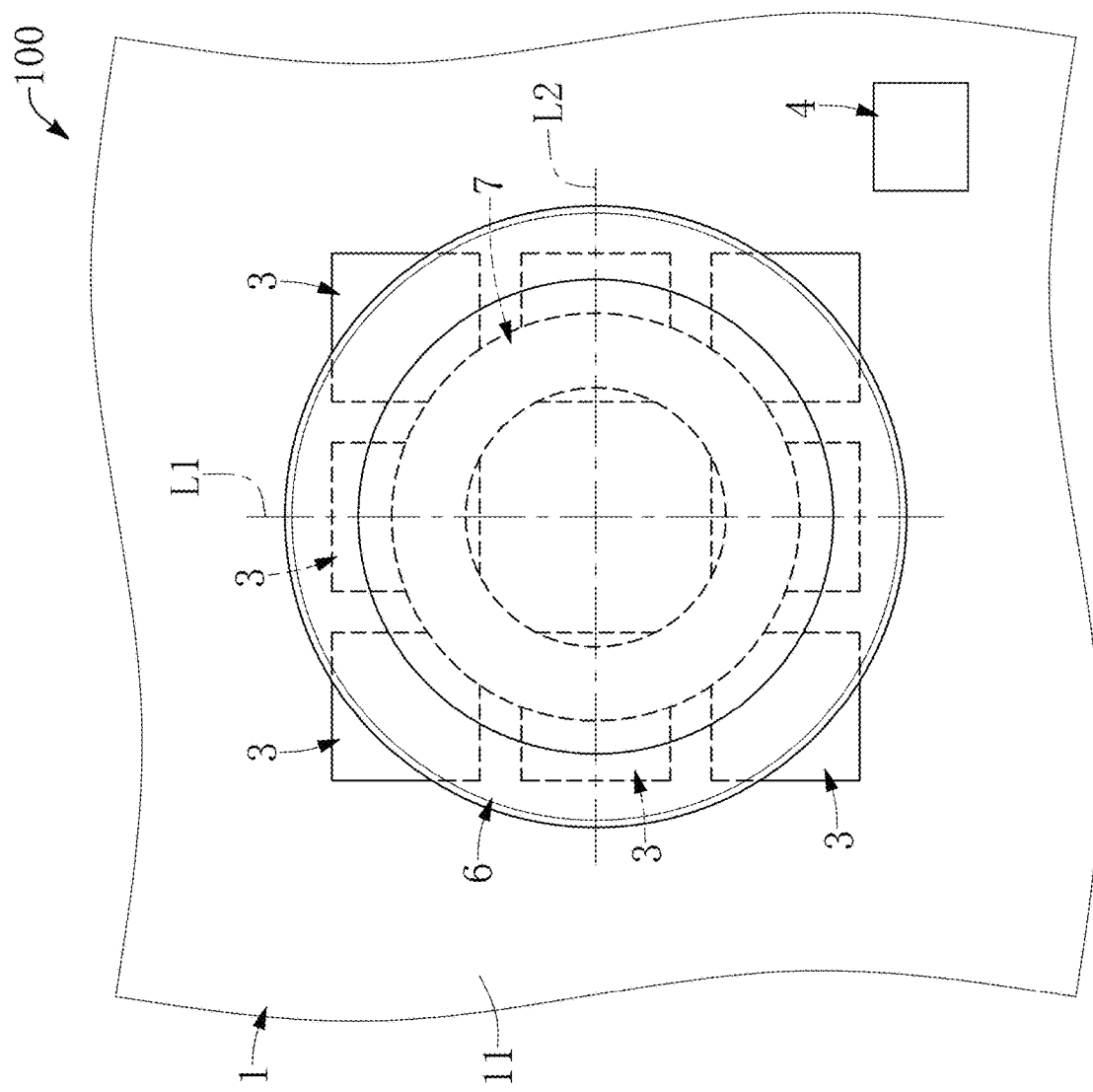

Reference is made to FIG. 6 and FIG. 7, which are respectively schematic top views of the input device according to a third embodiment and a fourth embodiment of the present disclosure. The embodiment shown in FIG. 6 is mainly different from the previous embodiments in that the quantity of the magnetic sensor 3 included in the input device 100 is three. The three magnetic sensors 3 are disposed at three vertices of a virtual triangle T, respectively. In addition, each magnetic sensor 3 is positioned within the orthogonal projection area of the magnetic member 7 on the substrate 1. The processor 4 receives the sensing signals transmitted by the three magnetic sensors 3, so as to control the cursor to move on the X-Y plane. The embodiment shown in FIG. 7 is mainly different from the previous embodiments in that the quantity of the magnetic sensor 3 included in the input device 100 is more than one, and the magnetic sensors 3 are disposed to surround the support structure 2.

Figure 8:
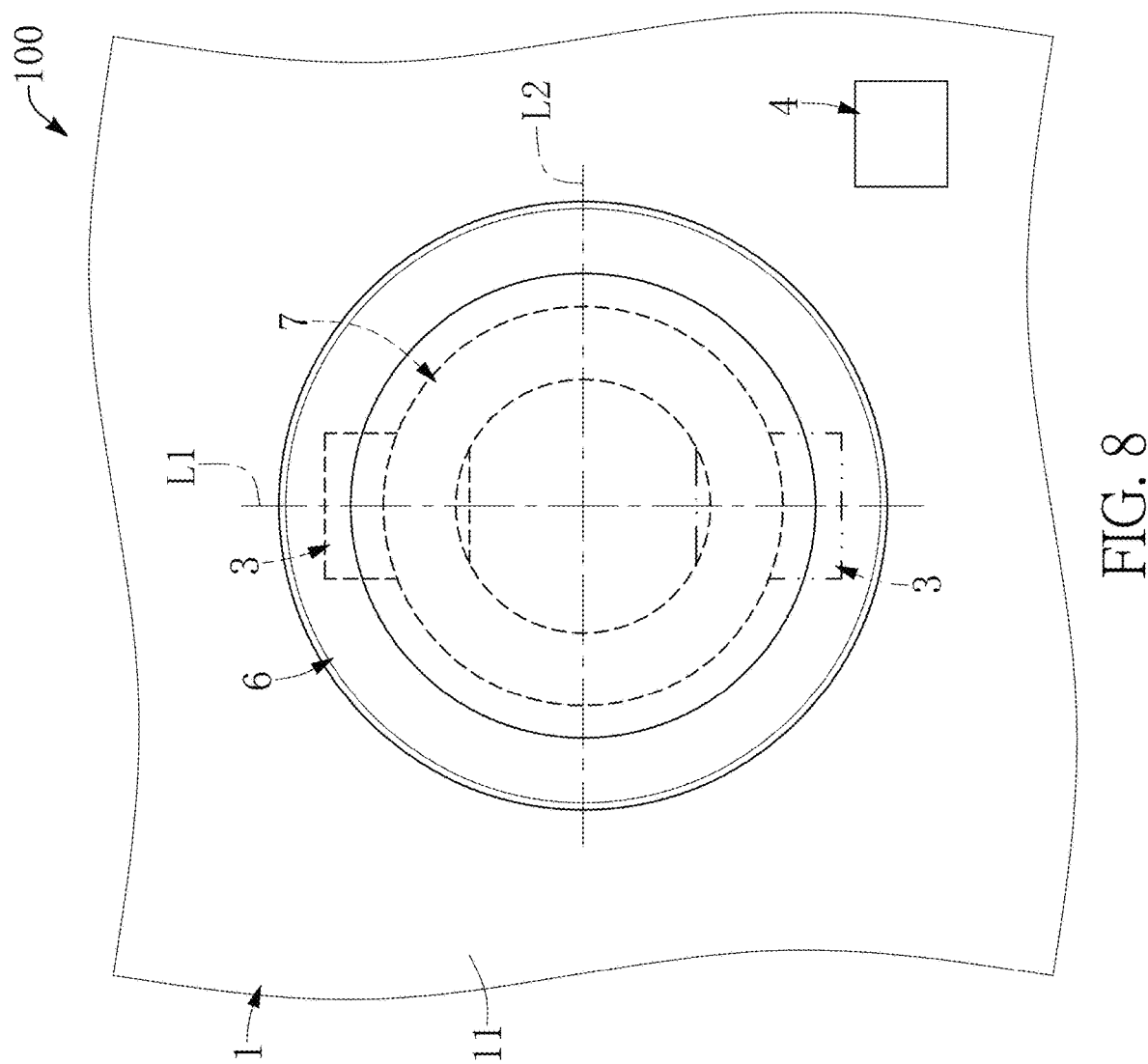
FIG. 8 is a schematic top view of the input device according to a fifth embodiment of the present disclosure.

Reference is made to FIG. 8, which is a schematic top view of the input device according to a fifth embodiment of the present disclosure. The present embodiment is mainly different from the previous embodiments in that the quantity of the magnetic sensor 3 included in the input device 100 is one (located at a top position in the drawing and defined by broken lines), and the input device 100 can only sense the actuation of the cover 6 in a single axial direction. In a practical application, the input device 100 of the present embodiment can be installed on, for example, the conventional mouse, so as to replace a scroll wheel of the conventional mouse. That is to say, when the user pushes the cover 6 forward, the control signal transmitted by the processor 4 to the computer will be equivalent to a signal of scrolling the scroll wheel of the conventional mouse forward. Conversely, the control signal transmitted by the processor 4 to the computer will be equivalent to a signal of scrolling the scroll wheel of the conventional mouse backward. It should be noted that, in an alternative embodiment of FIG. 8, the quantity of the magnetic sensor 3 included in the input device 100 is two (located at a bottom position in the drawing and defined by phantom lines), and the two magnetic sensors 3 are disposed on the same axis.

Figure 9:
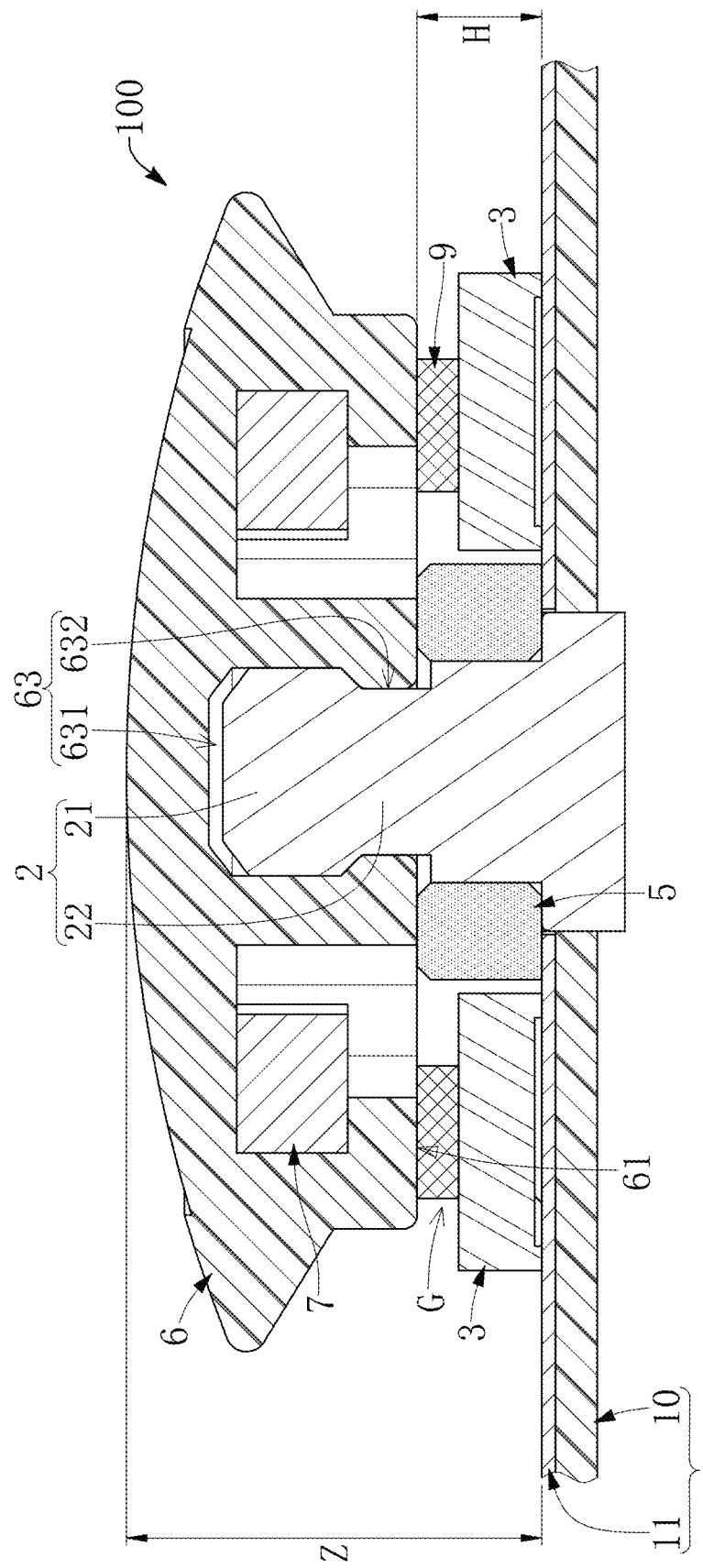
FIG. 9 is a schematic cross-sectional view of the input device according to a sixth embodiment of the present disclosure.

Reference is made to FIG. 9, which is a schematic cross-sectional view of the input device according to a sixth embodiment of the present disclosure. The present embodiment is mainly different from the previous embodiments in that the input device 100 further includes an elastic auxiliary restoring member 9. The elastic auxiliary restoring member 9 is disposed between the cover 6 and the magnetic sensor 3. The elastic auxiliary restoring member 9 can be, for example, an annular elastic structure, but is not limited thereto. The elastic auxiliary restoring member 9 is a non-magnetic structure.

When the cover 6 is pressed, the cover 6 presses against the elastic auxiliary restoring member 9, and the elastic auxiliary restoring member 9 is elastically deformed. When the cover 6 is no longer pressed, an elastic restoring force generated by elastic deformation of the elastic auxiliary restoring member 9 will assist the cover 6 to return to the state before being pressed. Through the configuration of the elastic auxiliary restoring member 9, when the cover 6 is no longer pressed, the cover 6 can more quickly return to the state before being pressed. The shape and the quantity of the elastic auxiliary restoring member 9 can be adjusted according to practical requirements, and are not limited herein.

Figure 10:
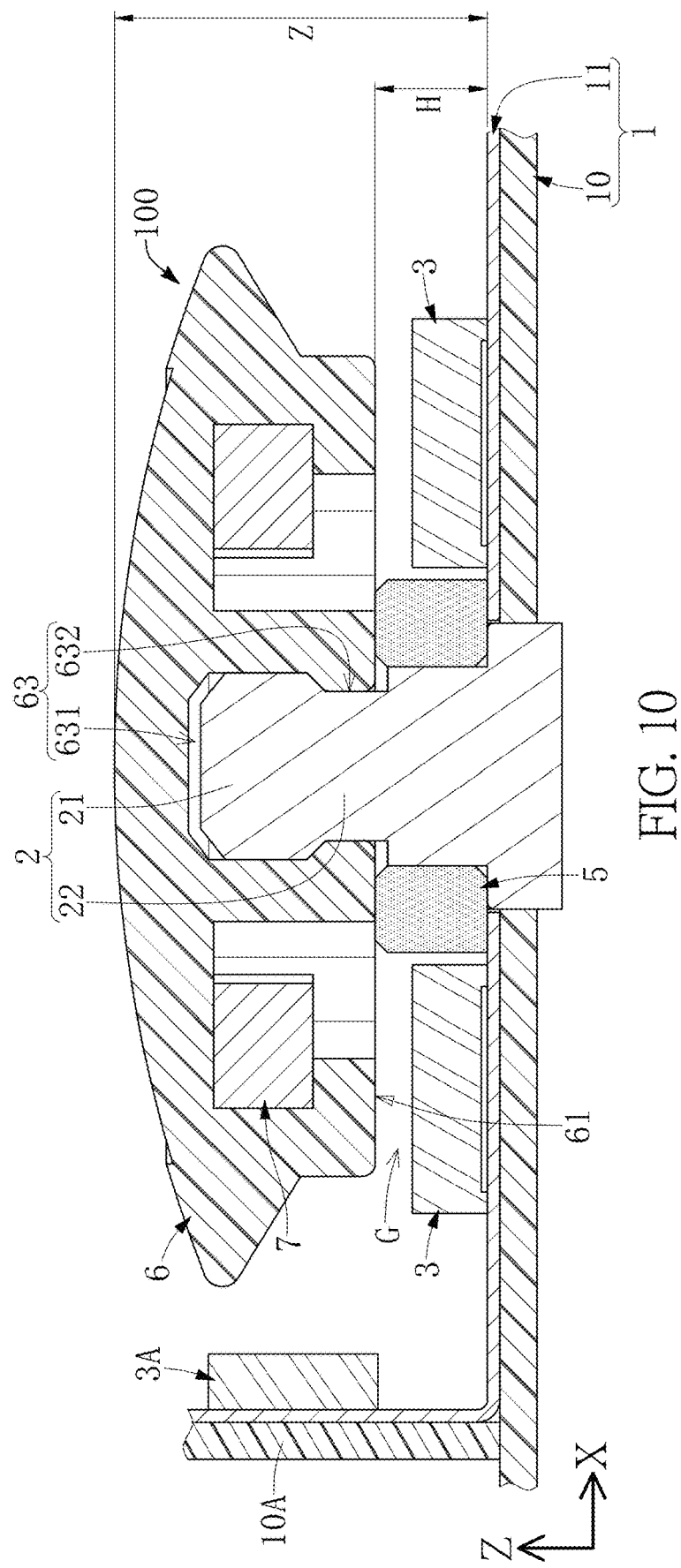
FIG. 10 is a schematic cross-sectional view of the input device according to a seventh embodiment of the present disclosure.

Reference is made to FIG. 10, which is a schematic cross-sectional view of the input device according to a seventh embodiment of the present disclosure. One of the differences between the present embodiment and the above-mentioned first embodiment is that the input device 100 is further provided with a vertical substrate 10A, and a magnetic sensor is disposed on the vertical substrate 10A. For ease of illustration, the magnetic sensor disposed on the vertical substrate 10A is defined as an auxiliary magnetic sensor 3A. The auxiliary magnetic sensor 3A is positioned within an orthogonal projection area of the magnetic member 7 on the vertical substrate 10A. The support structure 2 can be an elastic structure, and the user can operate the cover 6 to move in a direction toward the auxiliary magnetic sensor 3A. In this configuration, after the processor 4 receives a sensing signal transmitted by the auxiliary magnetic sensor 3A, whether the user moves the cover 6 in the direction toward or in a direction away from the auxiliary magnetic sensor 3A can be determined, and a control signal that corresponds thereto is generated. For example, the control signal generated after the processor 4 receives the sensing signal transmitted by the auxiliary magnetic sensor 3A can be equivalent to the control signal that is correspondingly generated by scrolling the scroll wheel of the conventional mouse forward or backward. Naturally, the quantity and the placement position of the vertical substrate 10A and the auxiliary magnetic sensor 3A may vary according to practical requirements, and are not limited to the descriptions above or those shown in the drawing. It should be noted that, in a different embodiment, the support structure 2 can be connected to the substrate 1 by use of a slidable structure (e.g., a slide rail), such that the user can operate the cover 6 to move in the direction toward or away from the auxiliary magnetic sensor 3A.

Figure 11:
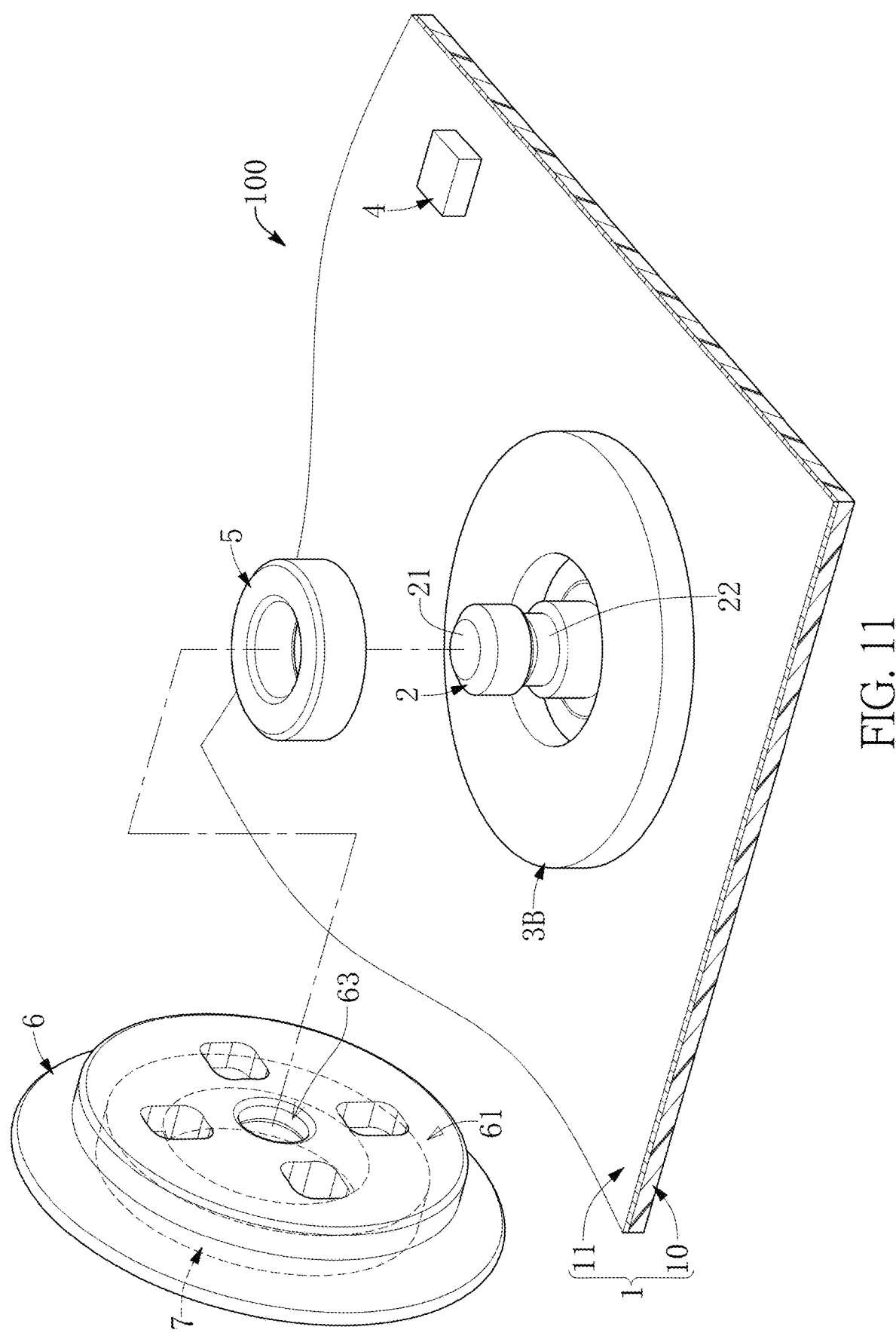
FIG. 11 is a schematic partially exploded view of the input device according to an eighth embodiment of the present disclosure.

Reference is made to FIG. 11, which is a schematic partially exploded view of the input device according to an eighth embodiment of the present disclosure. Different from the previous embodiment, the magnetic sensor in the present embodiment is an annular magnetic sensor 3B, and the annular magnetic sensor 3B includes at least one magnetic induction coil. By packaging the magnetic induction coil as the annular magnetic sensor 3B, ease of assembly can be achieved. In this way, assembly steps and time can be reduced, and the overall volume of an input device can be further reduced.

In an alternative example of the present embodiment, more than one magnetic member 7 is disposed on the cover 6, and multiple induction coils that correspond in position to the magnetic members 7 are disposed in the annular magnetic sensor 3B.

Beneficial Effects of the Embodiments

In conclusion, in the electronic device and the input device provided by the present disclosure, due to the magnetic induction characteristics, the characteristics of having a stronger signal as a distance between the magnetic member and the magnetic sensor decreases, and nonuse of the compression spring (the cover that is no longer pressed returns to its position by the elastic restoring structure), the overall volume of the input device can be significantly reduced, and the overall height of the input device can be less than 4 mm. Furthermore, the sensing sensitivity of the magnetic sensor can be effectively enhanced through the configuration in which the magnetic sensor is positioned within the orthogonal projection area of the magnetic member on the substrate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An input device, comprising:
   a support structure, wherein one end of the support structure is fixed to a substrate;
   a cover, wherein one side of the cover is fixed to another end of the support structure;
   at least one magnetic member disposed on the cover;
   a vertical substrate disposed perpendicular to the substrate;
   at least one magnetic sensor disposed on the substrate, wherein the at least one magnetic member is spaced apart from the at least one magnetic sensor, and the at least one magnetic sensor is positioned within an orthogonal projection area of the at least one magnetic member on the substrate; and
   a processor electrically connected to the at least one magnetic sensor;
   wherein the cover is operable to move relative to the substrate via the support structure, and the at least one magnetic member is movable with the cover, such that the at least one magnetic sensor senses a magnetic force change and correspondingly generates a sensing signal; wherein the processor converts the sensing signal into a control signal, and transmits the control signal to an electronic device; wherein the electronic device controls movement of a cursor according to the control signal, or the electronic device uses the control signal for direction control of an application program, or as a mouse single-click signal or a mouse double-click signal;
   wherein the at least one magnetic sensor included in the input device is plural in number; wherein at least one of the magnetic sensors is mounted on the vertical substrate and is defined as an auxiliary magnetic sensor; wherein the auxiliary magnetic sensor is positioned within an orthogonal projection footprint of the at least one magnetic member on the vertical substrate;
   wherein the magnetic sensors on the substrate is configured to provide X-Y cursor control, and the auxiliary magnetic sensor is configured to provide scroll or accelerated movement control without increasing an overall device height of the input device less than 4 mm enabled by an elastic restoring structure.

2. The input device according to claim 1, wherein the elastic restoring structure disposed on the substrate, wherein the elastic restoring structure is sleeved on the one end of the support structure, and one portion of the cover abuts against the elastic restoring structure; wherein, when the cover is pressed, the cover presses against the elastic restoring structure, and the elastic restoring structure is elastically deformed.

3. The input device according to claim 1, wherein the at least one magnetic sensor included in the input device is two in number, the two magnetic sensors are disposed on a same axis or are respectively disposed on a first axis and a second axis, and the first axis is not parallel to the second axis.

4. The input device according to claim 1, wherein the at least one magnetic sensor included in the input device is plural in number, and the magnetic sensors are disposed to surround the support structure.

5. The input device according to claim 4, wherein the magnetic sensors included in the input device are four in number or three in number; wherein, when the magnetic sensors included in the input device are four in number, two of the four magnetic sensors are disposed on a first axis, another two of the four magnetic sensors are disposed on a second axis, and the first axis is not parallel to the second axis; wherein, when the magnetic sensors included in the input device are three in number, and the three magnetic sensors are disposed at three vertices of a virtual triangle, respectively.

6. The input device according to claim 1, wherein the at least one magnetic sensor is an annular magnetic sensor, the annular magnetic sensor is disposed to surround the support structure, and the annular magnetic sensor includes at least one magnetic induction coil.

7. The input device according to claim 1, further comprising an elastic auxiliary restoring member, wherein the elastic auxiliary restoring member is disposed between the cover and the at least one magnetic sensor, and is a non-magnetic structure; wherein, when the cover is pressed, the cover presses against the elastic auxiliary restoring member, and the elastic auxiliary restoring member is elastically deformed.

8. The input device according to claim 1, wherein, when the processor determines that the cover is continuously pressed in a same direction for more than a predetermined time according to the sensing signal, or when the processor determines that a movement distance of the cover exceeds a predetermined distance according to the sensing signal, the processor correspondingly generates a rapid movement control signal, and the electronic device controls the cursor to quickly move in one direction according to the rapid movement control signal.

9. The input device according to claim 1, wherein the at least one magnetic sensor included in the input device is plural in number; wherein, when the processor simultaneously receives the sensing signals transmitted by the magnetic sensors, the processor correspondingly generates the mouse single-click signal or the mouse double-click signal.

10. An electronic device, comprising: an electronic body and the input device as claimed in claim 1, wherein the input device is disposed on the electronic body, and the electronic body is a laptop computer, a keyboard, a presentation remote, a mobile phone, a tablet computer, a joystick, or a mouse.

11. The electronic device according to claim 10, wherein the elastic restoring structure disposed on the substrate, the elastic restoring structure is sleeved on the one end of the support structure, and one portion of the cover abuts against the elastic restoring structure; wherein, when the cover is pressed, the cover presses against the elastic restoring structure, and the elastic restoring structure is elastically deformed.

12. The electronic device according to claim 10, wherein the at least one magnetic sensor included in the input device is two in number, the two magnetic sensors are disposed on a same axis or are respectively disposed on a first axis and a second axis, and the first axis is not parallel to the second axis.

13. The electronic device according to claim 10, wherein the at least one magnetic sensor included in the input device is plural in number, and the magnetic sensors are disposed to surround the support structure.

14. The electronic device according to claim 13, wherein the magnetic sensors included in the input device are four in number or three in number; wherein, when the magnetic sensors included in the input device are four in number, two of the four magnetic sensors are disposed on a first axis, another two of the four magnetic sensors are disposed on a second axis, and the first axis is not parallel to the second axis; wherein, when the magnetic sensors included in the input device are three in number, and the three magnetic sensors are disposed at three vertices of a virtual triangle, respectively.

15. The electronic device according to claim 10, wherein the at least one magnetic sensor is an annular magnetic sensor, the annular magnetic sensor is disposed to surround the support structure, and the annular magnetic sensor includes at least one magnetic induction coil.

16. The electronic device according to claim 10, wherein the input device further includes an elastic auxiliary restoring member disposed between the cover and the at least one magnetic sensor, and the elastic auxiliary restoring member is a non-magnetic structure; wherein, when the cover is pressed, the cover presses against the elastic auxiliary restoring member, and the elastic auxiliary restoring member is elastically deformed.

17. The electronic device according to claim 10, wherein, when the processor determines that the cover is continuously pressed in a same direction for more than a predetermined time according to the sensing signal, or when the processor determines that a movement distance of the cover exceeds a predetermined distance according to the sensing signal, the processor correspondingly generates a rapid movement control signal, and the electronic device controls the cursor to quickly move in one direction according to the rapid movement control signal.

18. The electronic device according to claim 10, wherein the at least one magnetic sensor included in the input device is plural in number; wherein, when the processor simultaneously receives the sensing signals transmitted by the magnetic sensors, the processor correspondingly generates the mouse single-click signal or the mouse double-click signal.

* * * * *